April 14, 1931.      S. NORMAN      1,801,238
DEVICE FOR INCREASING THE CAPACITY OF WET MACHINES AND FOR
INCREASING THE THICKNESS OF SHEETS EMANATING THEREFROM
Filed Sept. 25, 1929

Sigurd Norman
Inventor
Attorney

Patented Apr. 14, 1931

1,801,238

UNITED STATES PATENT OFFICE

SIGURD NORMAN, OF NEWBERG, OREGON

DEVICE FOR INCREASING THE CAPACITY OF WET MACHINES AND FOR INCREASING THE THICKNESS OF SHEETS EMANATING THEREFROM

Application filed September 25, 1929. Serial No. 395,038.

My invention relates to wet machines, wherein it is desired to withdraw elements held in suspension within a tank and transform the suspended elements into sheets.

The primary purpose of my invention is to increase the thickness of the sheet and the capacity of the machine.

The invention consists primarily of a tank, a cylindrical screen revolvably disposed within the tank and having a suction created upon the screen so that the elements held in suspension in the solution, within the tank, are picked up by the revolving screen and in being released from the revolving screen are transformed into an endless sheet. Heretofore, great difficulty has been experienced in the producing of a relatively thick sheet by the wet process. This has been especially true in the manufacture of pulp and paper and other sheet products by the withdrawal of the elements composing the sheet from a tank in which the sheet-producing elements are held in suspension within the solutions disposed within the tank.

I have found that by the placing of an endless belt within the tank solution and permitting the same to engage the surface of the revolving screen upon the dipping side of the screen that the thickness of the sheet produced depends upon the amount of lap that the belt is permitted to contact with the surface of the revolving screen. The suction maintains the endless belt in intimate engagement with the surface of the revolving screen. I therefore provide suitable means for predetermining the amount of lap that the endless belt is permitted to contact with the revolving screen.

One of the objects of my invention is to provide automatic means for predetermining the amount of sheet forming elements that are permitted to engage with the revolving screen.

A further object of my invention consists in providing means for preventing the deposit of the sheet forming elements upon the revolving screen at the dipping side of the revolving screen, thereby causing the sheet forming elements to be deposited upon the revolving screen at or near the outlet of the screen from the dipping solution, thereby lessening the load of the mass clinging to the screen until the same has substantially reached the point of release from the dipping solution.

Heretofore the only controls provided for this purpose has been by increasing or decreasing the density of the solutions disposed within the tank or vat. This required a substantial amount of time and when a break occurs within the sheet a very substantial loss of time is encountered.

By my new and improved device regulatory provision is provided within the tank, through the operation of which, instantaneous results are obtained in the thickness of the sheet to be produced.

A further object of my invention resides in providing suitable means for predetermining the thickness of the sheet being produced.

A still further object of my invention provides suitable means for predetermining the amount and location of the deposit being formed upon the revolving screen surface disposed within the solution holding vat to thereby regulate the position of the forming of the sheet relative to the screen and to predetermine the thickness of the same.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 1:
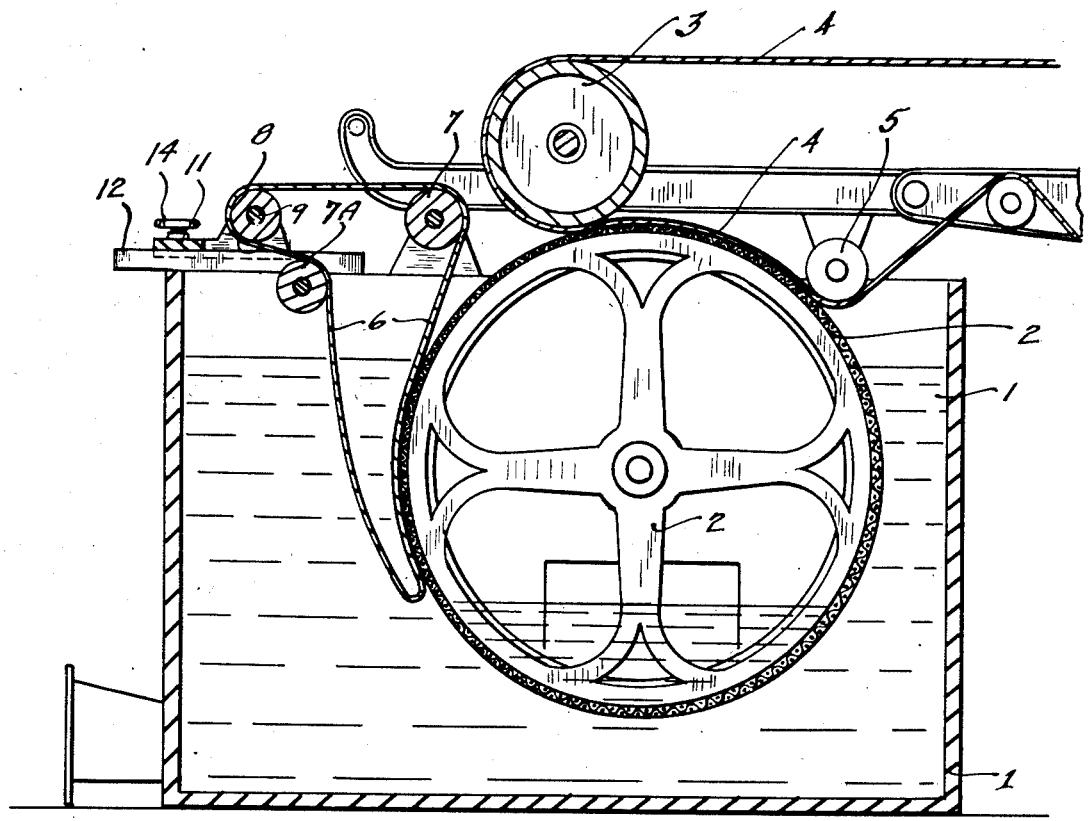
Fig. 1 is a sectional, side elevation of the vat in which the screen is revolvably disposed and illustrating the associated elements that are provided in wet machines.
Figure 2:
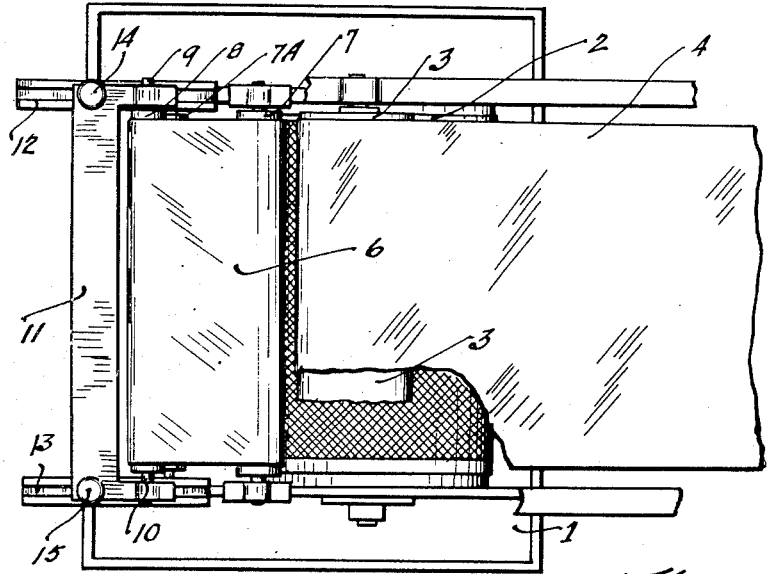
Fig. 2 is a top, plan view, partially in section, of the mechanism illustrated in Fig. 1.

1 is the vat in which the wet machine is disposed and 2 in the cylinder revolvably disposed within the vat. The couch roll is illustrated at 3. The bottom felt is illustrated at 4, the bottom felt being trained around the tightener roll 5 and the couch roll 3 and is made to engage a top of the upper portion of the cylinder 2. I have found that by the placing of an endless belt 6 in contact with the dipping side of the cylinder 2 that the cylinder does not pick up the sheet-forming elements disposed within the vat, until a greater circumference of travel has occurred within the dipping solutions so that the heaviest sheet is not formed until a point is reached where the outer surface of the cylinder emerges from the solution disposed within the vat and in doing so a much heavier sheet may be carried by the revolving cylinder. The endless belt 6 is trained about a fixed roller 7 and about an adjustable roller 8 and the surface of the belt 6 is permitted to engage the surface of the cylinder and to lap therealong. The spaced relationship of the rollers 7 and 8 predetermines the amount of lap that the endless belt will engage the surface of the cylinder. The shafts 9 and 10 of the adjustable roller 8 are disposed within suitable bearings within the adjusting base 11. The adjusting base 11 engages upon its oppositely disposed ends upon guideways 12 and 13 and the base 11 may be fixedly positioned within the guideways by the hand locking screws 14 and 15.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a screen cylinder revolvably disposed within a liquid-holding vat, an endless belt adapted to engage the dipping side of the cylinder and means for suitably predetermining the amount of lapping contact of the belt with the cylinder.

2. In a device of the class described, the combination of a vat, sheet-forming elements held in suspension within the vat, a cylinder revolvably disposed within the vat and an endless belt adapted to engage a part of the surface of the cylinder and to prevent the adhesion of the sheet-forming elements thereto on the dipping side of the cylinder.

3. In a device of the class described, the combination of a vat, sheet-forming solutions held in suspension within a liquid disposed within the vat, a cylinder having a screened surface revolvably disposed within the vat and means for predetermining the amount of surface upon which elements will be permitted to cling to the surface of the cylinder.

4. In a device of the class described, the combination of a liquid-holding vat, sheet-forming elements held within suspension in a solution disposed within the vat, a screened, covered cylinder revolvably disposed within the vat and suitable means for predetermining the amount of surface of the cylinder to which the sheet forming elements are permitted to cling to the cylinder.

5. In a device of the class described, the combination of a cylinder, an endless belt lapping a part of the cylinder and means for predetermining the amount of lap the endless belt will be permitted to engage the surface of the cylinder.

6. In a device of the class described, the combination of a cylinder, an endless belt trained about spaced rollers to permit a part of the belt surface to engage a part of the surface of the cylinder and means for predetermining the spaced relation of the rollers.

7. A method of predetermining the thickness of a sheet to be formed by a wet machine consisting in preventing the sheet-forming elements from clinging to the dipping side of the cylinder for a predetermined distance.

8. A method of predetermining the thickness of a sheet to be formed by a wet machine consisting in engaging the surface of the cylinder with an endless belt for a portion of the surface of the cylinder on the dipping side of the cylinder.

9. A method of increasing the carrying capacity of the cylinder of a wet machine consisting in sealing off a part of the cylinder of the wet machine from the solution at the dipping side of the cylinder.

10. A method of predetermining the thickness of the sheet to be formed by the cylinder of a wet machine consisting in providing suitable means for sealing off a predetermined amount of the surface of the cylinder of the wet machine from the dipping solutions.

SIGURD NORMAN.